United States Patent Office 3,060,998
Patented Oct. 30, 1962

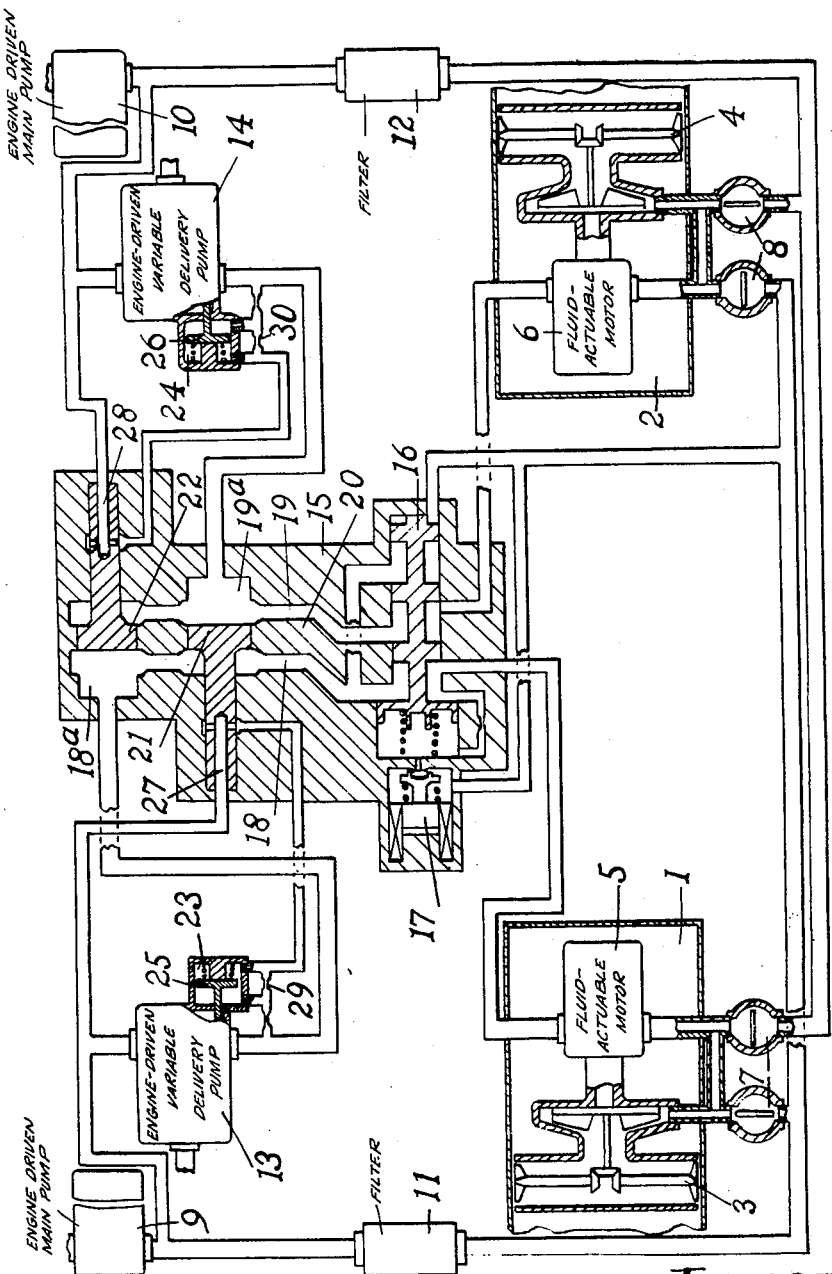

3,060,998
AIRCRAFT FUEL SUPPLY SYSTEMS
Robert Henry Bell, Birmingham, and Thomas Cochrane Campbell, St. Annes-on-Sea, England, assignors to Joseph Lucas (Industries) Limited, Birmingham, England, and The English Electric Company, London, England
Filed Mar. 18, 1960, Ser. No. 15,864
Claims priority, application Great Britain Mar. 26, 1959
4 Claims. (Cl. 158—36.4)

This invention relates to fuel supply systems for aircraft of the kind having a pair of engines, and a pair of fuel tanks mounted within the wings at opposite sides of the aircraft respectively, each fuel tank incorporating a boost pump for supplying fuel to an engine-driven fuel pump associated with one of the engines respectively.

The object of the invention is to provide a fuel supply system for such an aircraft in a convenient and efficient form.

According to the invention a fuel supply system for an aircraft of the kind specified comprises in combination a pair of fluid-actuated motors for driving the pair of boost pumps respectively, a pair of variable delivery pumps driven by the pair of engines respectively for supplying motive fluid in the form of fuel to the pair of motors, and means for maintaining the output of said variable delivery pumps at approximately half their maximum output whilst both pumps are in action and for increasing the output of one of the pumps automatically in the event of the other pump failing to function.

The accompanying drawing is a part-sectional diagrammatic view illustrating one example of the invention.

Referring to the drawing, the aircraft has two engines (not shown), hereinafter termed the port engine and the starboard engine respectively, and a pair of fuel tanks 1, 2, situated in the port and starboard wings of the aircraft respectively. In the tanks 1, 2 respectively are a pair of submerged boost pumps 3, 4 which are driven by associated submerged and fluid actuated motors 5, 6. Fuel is fed by each boost pump 3, 4 according to the setting of pilot controlled valves 7, 8 to one or other of a pair of fuel pumps 9, 10 which supply fuel to, and are driven by the port and starboard engines respectively, and it will be seen that with the valves 7, 8 in the position shown in the drawing fuel is fed by the pumps 3, 4 to the pumps 9, 10 respectively. However, in the event of one of the engines consuming more fuel than the other the valves 7, 8 can be reversed to maintain the trim of the aircraft.

At the low pressure side of the fuel pumps 9, 10 there is disposed within the fuel supply lines a pair of filters 11, 12 respectively which are connected by pipes to the inlets of a pair of variable delivery pumps 13, 14 driven by the associated engines.

Within the fuel system is a body part 15 within which is contained a slide valve 16 operable by a solenoid 17. The solenoid 17 is operable by the pilot in synchronism with the valves 7, 8 and the arrangement is such that in the position shown the pumps 13, 14 supply motive fluid to the motors 5, 6 respectively. However, when the valves 7, 8 are operated so that the pumps 3, 4 feed fuel to the pumps 10, 9 respectively, the solenoid 17 is energised to move the valve 16 to its alternative position, in which motive fluid from the pumps 13, 14 is fed to the motors 6, 5 respectively for the purpose of enabling the fuel supply to the pumps 9 and 10, which are driven respectively by the port and starboard engines, to be normally controlled by the corresponding engine-driven pumps 13 and 14 irrespective of the positions of the valves 7 and 8.

The body part 15 also incorporates means whereby in the event of one of the variable delivery pumps 13, 14 failing to function, the other pump will supply motive fluid to both motors 5, 6. For this purpose the body part 15 has formed in it two passages 18, 19 which are separated by a wall 20 incorporating a pair of cylindrical apertures. Within the apertures are normally disposed a pair of pistons 21, 22 respectively having oppositely directed stems which extend through the passages 18, 19 respectively into cylindrical bores in the body part, movement of the stems into these cylindrical bores being limited to the position shown.

The outlets of the pumps 13, 14 are connected respectively to the passages 18, 19 through ports disposed in the base of cylindrical recesses $18^a$, $19^a$ formed in the body part 15 opposite the pistons 22, 21 respectively, and the arrangement is such that when both pumps 13, 14 are in action the pressure of fuel in the passages 18, 19 will cause the pistons 21, 22 to be retained in position within the apertures to separate the passages 18, 19. However, in the event of, for example, the pump 13 failing to function, the pressure of fuel in the passage 18 will fall, and as a result the pressure of fuel in the passage 19 will by its action on the annular area of the piston 22, cause the latter to move into the cylindrical recess $18^a$, thereby connecting the pump 14 to both passages 18, 19 and closing the port connected to the pump 13. Similar considerations apply when the pump 14 fails to function.

When both pumps 13, 14 are in action they are arranged to deliver fuel at approximately half their maximum output, but when one of the pumps fails the output of the other pump is automatically doubled to supply the required quantity of fuel for both motors. For this purpose the output of the pumps respectively are controlled by servo cylinders 23, 24 containing spring-loaded pistons 25, 26 which at one side are subjected through restricted orifices to the output pressure of the respective pump acting against the force of the spring. The opposite ends of the cylinders 23, 24 are connected respectively to the inlet sides of the pumps 13, 14 through passages 27, 28 in the stems of the pistons 21, 22 when the latter are in their normal positions, so that the pressure in the last mentioned ends of the cylinders are reduced when the pistons occupy their normal positions. Moreover, any convenient means such as restricted orifices 29, 30 are provided for permitting a slow escape of fuel from the high pressure end to the low pressure end of the servo-cylinders 23, 24 respectively. When a pump fails to function and the appropriate piston in the body part is moved as previously mentioned, the stem of this piston will interrupt the connection between the servo cylinder of the other pump and its inlet side. Thus the pressures at opposite sides of the servo piston will be equalised, and the spring will move the servo piston to a position to provide maximum output of the pump. Conveniently the pumps 13, 14 are of the swash plate type and movement of the stem serves to adjust the angularity of the swash plate.

Having thus described our invention what we claim as new and desire to secure by Letters Patent is:

1. For use in an aircraft of the kind having a pair of engines, a pair of main pumps adapted to be driven by, and to supply fuel to, the engines respectively a pair of fuel tanks mounted respectively at opposite sides of the aircraft within the wings thereof, and a pair of boost pumps respectively mounted within the fuel tanks for supplying fuel from the fuel tanks to the main pumps respectively, a fuel supply system comprising in combination with the main pumps, the fuel tanks, and the boost pumps, a pair of fluid-actuable motors respectively connected to said boost pumps for imparting motion thereto, a pair of variable delivery pumps adapted to be driven by the engines respectively, and provided respectively with a pair of output-controlling servo-mechanisms each having a spring-loaded piston contained in a cylinder, and associated means through the medium of which the opposite ends of the cylinder are in restricted communication with each other, one end of the cylinder communicating with the output side of the corresponding variable delivery pump for enabling the output pressure of the latter to oppose movement of the piston by its spring loading, and the other end of the cylinder is communicatable with the inlet side of the corresponding variable delivery pump when the latter is in action, so that when both of said variable delivery pumps are in action, the spring-loaded pistons of said servo-mechanisms are held by the output pressures of the corresponding variable delivery pumps in positions for maintaining the output of each variable delivery pump at approximately half of its maximum output, fuel-conducting means connecting the output sides of said boost pumps respectively to the inlet sides of said main pumps, and to the inlet sides of said variable delivery pumps, additional fuel-conducting means, including a body part having therein a pair of passages through which the output sides of said variable delivery pumps are respectively communicable with the inlet sides of said fluid-actuable motors when both of said variable delivery pumps are in action, and additional passages through which the inlet sides of said variable delivery pumps communicate respectively with the cylinders of the corresponding servo-mechanisms when both of said variable delivery pumps are in action, and a pair of pressure-responsive members mounted within bores in said body part, and provided respectively with a pair of portions which are each exposed at opposite sides respectively to the fuel delivery pressures of said variable delivery pumps, and which serve to prevent communication between said pair of passages when both of said variable delivery pumps are in action, said pressure-responsive members being also provided with a pair of additional portions which serve to control fuel flow through said additional passages respectively, and being arranged so that, in the event of one of said variable delivery pumps failing to function, one of said press-responsive members is moved by the pressure of fuel from the other variable delivery pump to a position for establishing communication between said pair of passages to permit the last mentioned variable delivery pump to supply fuel to both of said fluid-actuable motors, and for preventing fuel flow through one of said additional passages to interrupt communication between the servo-mechanism and the inlet side of the last mentioned variable delivery pump whereupon the latter automatically attains its maximum output under the action of the spring-loaded piston of its servo-mechanism.

2. A fuel supply system according to claim 1, wherein the said pair of passages in said body part are separated by a wall which forms a portion of said body part, and which is provided with a pair of spaced apertures, said pressure-responsive members having the form of pistons which are provided respectively with a pair of oppositely extending stems slidably supported within complementary bores in said body part, and which, when both of said variable delivery pumps are in action, respectively occupy the apertures in said wall so that, in the event of either of said variable delivery pumps failing to function, one of said pistons is moved, by the pressure of fuel delivered by the other variable delivery pump to a position out of the corresponding aperture in said wall for enabling communication between the said pair of passages in said body part to be established through the last mentioned aperture, and for causing the stem of the last mentioned piston to interrupt communication between the inlet side of the last mentioned variable delivery pump and the cylinder of the corresponding servo-mechanism.

3. A fuel supply system according to claim 1, and having a manually controllable valve which is mounted in said body part, and through which said pair of passages are communicatable respectively with the inlet sides of said fluid-actuable motors, said valve being movable for reversing the communications between said pair of passages and the inlet sides of said fluid-actuable motors.

4. A fuel supply system according to claim 3, and having additional manually controllable valves forming parts of the fuel conducting means connecting the output sides of said boost pumps respectively to the inlet sides of said main pumps, and to the inlet sides of said variable delivery pumps, said additional valves being movable for reversing the connections between the output sides of said boost pumps and the inlet sides of said main and variable delivery pumps.

References Cited in the file of this patent

UNITED STATES PATENTS

| | | |
|---|---|---|
| 1,900,050 | Ernst | Mar. 7, 1933 |
| 2,333,075 | Rol | Oct. 26, 1943 |
| 2,643,516 | Carlson | June 30, 1953 |
| 2,762,305 | Huber | Sept. 11, 1956 |
| 2,931,497 | Billen | Apr. 5, 1960 |